(12) United States Patent
Kim (10) Patent No.: US 8,664,898 B2
(45) Date of Patent: Mar. 4, 2014

(54) DEVICE AND METHOD OF STOPPING INDUCTION MOTOR

(75) Inventor: Kwang Yeon Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 235 days.

(21) Appl. No.: 13/412,524

(22) Filed: Mar. 5, 2012

(65) Prior Publication Data

US 2012/0229058 A1 Sep. 13, 2012

(30) Foreign Application Priority Data

Mar. 8, 2011 (KR) ........................ 10-2011-0020662

(51) Int. Cl.
*H02P 21/00* (2006.01)

(52) U.S. Cl.
USPC ...... 318/400.02; 318/432; 318/828; 318/652; 318/779; 318/400.11; 310/156.01; 180/446; 180/444

(58) Field of Classification Search
USPC ............... 318/400.02, 400.11, 400.22, 400.4, 318/400.07, 400.014, 432, 434, 560, 727, 318/799, 800, 801, 805; 180/65.245, 180/65.285; 254/267, 338; 363/35, 71, 97, 363/131; 361/216; 320/166, 136
See application file for complete search history.

(56) References Cited

U.S. PATENT DOCUMENTS

| 7,825,620 | B2 * | 11/2010 | Nakatsugawa et al. ........ 318/800 |
| 8,022,660 | B2 * | 9/2011 | Kinpara et al. ............... 318/812 |
| 8,179,068 | B2 * | 5/2012 | Yuuki et al. ................... 318/432 |

FOREIGN PATENT DOCUMENTS

| JP | 2007135400 |   | 5/2007 |
| JP | 2007135400 | A * | 5/2007 |
| JP | 2009247036 |   | 10/2009 |
| JP | 2009247036 | A * | 10/2009 |
| KR | 1020060006637 |   | 1/2006 |

* cited by examiner

*Primary Examiner* — Eduardo Colon Santana
*Assistant Examiner* — Jorge L Carrasquillo
(74) *Attorney, Agent, or Firm* — Lee, Hong, Degerman, Kang & Waimey (57) ABSTRACT

Provided are a device and method of stopping an induction motor. The includes: a frequency commanding unit for generating an operating frequency corresponding to a rotational speed command of the induction motor; a q-axis and d-axis V/F converter for outputting a first q-axis voltage (Vq1) proportional to the generated operating frequency and a first d-axis voltage (Vd1) proportional to a 0 frequency; a q-axis PI current controller for outputting a second q-axis voltage (Vq2) for stopping the induction motor when the operating frequency reaches a stopping frequency; a d-axis PI current controller for outputting a second d-axis voltage (Vd2) for stopping the induction motor when the operating frequency reaches the stopping frequency; and a selection unit for selecting and outputting the first q-axis and d-axis voltages (Vq1 and Vd1) or the second q-axis and d-axis voltages (Vq2 and Vd2) according to the operating frequency generated by the frequency commanding unit.

12 Claims, 5 Drawing Sheets

DEVICE AND METHOD OF STOPPING INDUCTION MOTOR

CROSS-REFERENCE TO RELATED APPLICATIONS

Pursuant to 35 U.S.C. §119(a), this application claims the benefit of earlier filing date and right of priority to Korean Patent Application No. 10-2011-0020662, filed on Mar. 8, 2011, the contents of which are hereby incorporated by reference herein in its entirety.

BACKGROUND

The present disclosure relates to a device and method of stopping an induction motor, and more particularly, to a device for stably stopping an induction motor without a drastic change of output voltage and output current.

There are several methods of stopping an induction motor in rotation.

The several methods of stopping an induction motor include a method of lowering frequency applied from an inverter to an induction motor when the inductor motor is driven (accelerating or reducing speed) using the inverter, and a method of applying DC current to an inductor motor, and a method of reducing frequency while increasing the density of flux occurring in stators of an induction motor.

If described in more detail, one of related art methods of stopping an inductor motor is to lower a frequency applied from an inverter to the induction motor with reference to a predetermined time.

The method uses the following principle. That is, when a conversion amount of a frequency applied to stators is less than a rotational speed of an induction motor in rotation, a slip of the induction motor becomes negative (−), and accordingly, the induction motor slows down due to stopping torque therein.

However, according to this method, the kinetic energy of a rotator in rotation returns to a DC link condenser of an inverter, and accordingly, a voltage of the DC link is increased into a dangerous level.

Additionally, another method of stopping an induction motor is to apply DC current to stators of the induction motor. This method uses the following principle. That is, when DC current is applied to stators of the induction motor, spatially fixed flux occurs due to the DC current flowing in the stators. At this point, once the flux occurs, current induced in the rotator, and, due to the induced current, stopping torque occurs.

That is, when an inductor motor is stopped by using an inverter after operating in a predetermined speed, due to the great inertia of a load, even if output frequency reaches about 0 Hz, the induction motor rotates without stopping, and accordingly, DC current is applied to stators of the induction motor in order to stop the induction motor.

That is, an inverter reduces output frequency in order to stop an induction motor after driving the induction motor at a predetermined frequency. At this point, if the reduced output frequency reaches stopping frequency, in order to apply a predetermined DC current, the inverter applies a predetermined DC current to change a Voltage/Frequency (V/F) driving control mode into a Proportional-Integral (PI) current control mode to use the d-axis and q-axis output of a current controller.

Figure 1:
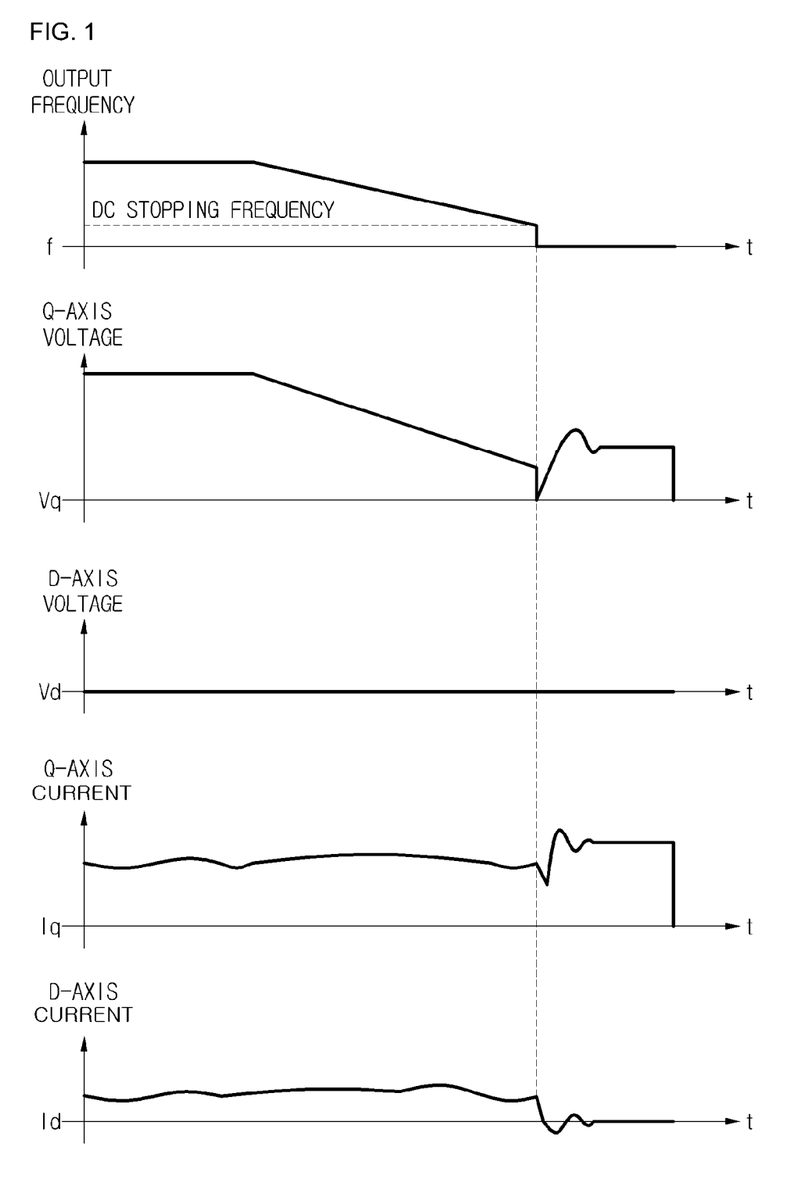
FIG. 1 is a view illustrating a current and voltage change in a related art stopping mode.

However, as shown in FIG. 1, if the V/F driving control mode change into the PI current control mode during stopping the induction motor, a drastic change in output voltage and current occurs, and due to this, the stopping torque of the induction motor is drastically changed so that stopping performance is deteriorated.

SUMMARY

Embodiments provide a device for stopping an induction motor by using a new method and a stopping method thereof.

Embodiments also provide a device for smoothly stopping an induction motor by reducing output voltage and its fluctuation width during stopping the induction motor, and a stopping method thereof.

In one embodiment, a device for stopping an induction motor includes: a frequency commanding unit for generating an operating frequency corresponding to a rotational speed command of the induction motor; a q-axis and d-axis V/F converter for outputting a first q-axis voltage (Vq1) proportional to the generated operating frequency and a first d-axis voltage (Vd1) proportional to a 0 frequency; a q-axis PI current controller for outputting a second q-axis voltage (Vq2) for stopping the induction motor when the operating frequency reaches a stopping frequency; a d-axis PI current controller for outputting a second d-axis voltage (Vd2) for stopping the induction motor when the operating frequency reaches the stopping frequency; and a selection unit for selecting and outputting the first q-axis and d-axis voltages (Vq1 and Vd1) or the second q-axis and d-axis voltages (Vq2 and Vd2) according to the operating frequency generated by the frequency commanding unit. The selection unit selects the first q-axis and d-axis voltages (Vq1 and Vd1) if the operating frequency corresponds to the driving frequency, and selects the second q-axis and d-axis voltages (Vq2 and Vd2) when the operating frequency reaches the stopping frequency.

In another embodiment, a method of stopping an induction motor includes: driving the induction motor on the basis of a first q-axis voltage (Vq1) proportional to an operating frequency and a first d-axis voltage (Vd1) proportional to a 0 frequency; determining whether the operating frequency reaches a stopping frequency; sequentially outputting a plurality of q-axis current command patterns and d-axis current command patterns when the operating frequency reaches the stopping frequency; and stopping the induction motor by using a second q-axis voltage (Vq2) and a second d-axis voltage (Vd2) corresponding to the plurality of sequentially outputted q-axis and d-axis current command patterns.

The details of one or more embodiments are set forth in the accompanying drawings and the description below. Other features will be apparent from the description and drawings, and from the claims.

DETAILED DESCRIPTION OF THE EMBODIMENTS

Suggested embodiments will be described below.

Hereinafter, detailed embodiments of the present invention will be described in more detail with reference to the accompanying drawings. However, the scope of the present invention is not limited thereto, and other embodiments with the addition, change, and deletion of another component may be easily suggested within the scope of the present invention.

The terms used in this specification are selected from currently widely used general terms in consideration of functions of the present invention, but may vary according to the intentions or practices of those skilled in the art or the advent of new technology. Additionally, in certain cases, there may be terms that an applicant may arbitrarily select, and in this case, their meanings are described below. Accordingly, the terms used in this specification should be interpreted on the basis of substantial implications that the terms have and the contents across this specification not the simple names of terms That is, in the description below, the meaning of 'include' does not exclude other components or operations besides the listed ones.

According to the embodiments of the present invention, on stopping an induction motor, a final voltage outputted before stopping the induction motor is set as an initial value for stopping the induction motor, and accordingly, a plurality of current command patterns are sequentially generated in order to gradually increase a final current command value for stopping the induction motor. Therefore, according to the embodiments of the present invention, a drastic current and voltage change occurring during induction motor stopping is prevented, so that the induction motor stops smoothly without a phenomenon that pulsation occurs or the induction motor rotates in a reverse direction and then stops.

Figure 2:
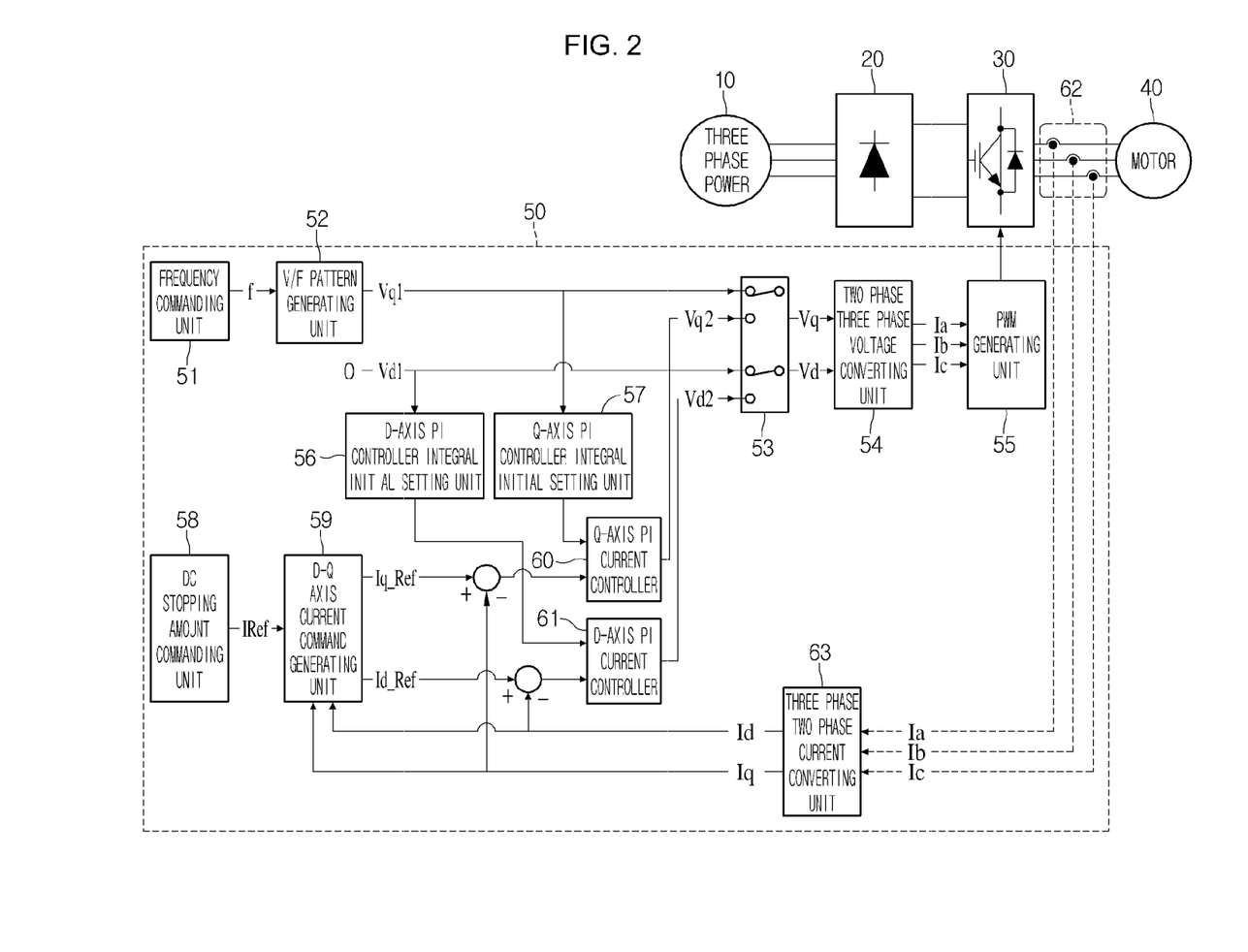
FIG. 2 is a view illustrating a configuration of a device for stopping an induction motor according to an embodiment.

FIG. 2 is a configuration diagram illustrating a configuration of a stopping device of an induction motor according to an embodiment.

Referring to FIG. 2, the stopping device of an induction operator includes a three phase power 20, a rectifying unit 20, a PWM voltage generating unit 30, an induction motor 40, and an inverter 50.

Additionally, the inverter 50 may include a frequency commanding unit 51, a q-axis V/F pattern generating unit 52, a selection unit 53, a two phase three phase voltage converting unit 54, a PWM generating unit 55, a d-axis PI controller integral initial setting unit 56, a q-axis PI controller integral initial setting unit 57, a DC stopping amount commanding unit 58, a d-q axis current command generating unit 59, a q-axis PI current controller 60, a d-axis PI current controller 61, a current detecting unit 62, and a three phase two phase current converting unit 63.

Hereinafter, the stopping device of an induction motor having the above configuration will be described in more detail.

The three phase power 10 supplies a three phase AC power to drive the induction motor 40.

The rectifying unit 20 receives a three phase AC power supplied from the three phase power 10, and accordingly, converts the received three phase AC power inputted from the three phase power 10 into DC power.

The PWM voltage generating unit 30 receives the DC power supplied from the rectifying unit 20, and then generates a PWM voltage corresponding to a PWM signal generated from the inverter 50.

The PWM is the acronym of pulse width modulation. That is, the PWM voltage generating unit 30 receives a PWM signal supplied from the inverter 50, and accordingly, generates a PWM voltage corresponding to the received PWM signal by using a power switch device.

The induction motor 40 generates rotation power by the PWM voltage supplied from the PWM voltage generating unit 30.

The inverter 50 generates a PWM signal for driving the induction motor 40.

Hereinafter, the configuration and operation of the inverter 50 will be described in more detail.

The frequency commanding unit 51 generates an operating frequency f corresponding to a rotational speed command.

The V/F pattern generating unit 52 generates a first q-axis voltage Vq1 proportional to the operating frequency f generated from the frequency commanding unit 51. That is, the V/F pattern generating unit 52 generates a first q-axis voltage Vq1 proportional to the operating frequency f generated from the frequency commanding unit 51.

The first q-axis voltage Vq1 outputted from the V/F pattern generating unit 52 is inputted to one end of the selection unit 53.

At this point, the V/F pattern generating unit 52 is a q-axis V/F pattern generating unit (not shown) for generating the first q-axis voltage Vq1. At this point, the V/F pattern generating unit 52 may further include a d-axis V/F pattern generating unit (not shown) for generating a first d-axis voltage Vd1 proportional to the 0 frequency. Accordingly, the first q-axis voltage Vq1 and the first d-axis voltage Vd1 generated from the V/F pattern generating unit 52 are inputted to one end of the selection unit 53.

As a result, the first q-axis voltage Vq1 proportional to the operating frequency f and the first d-axis voltage Vd1 proportional to the 0 frequency are inputted to the selection unit 53.

The selection unit 53 selects and outputs the first q-axis voltage Vq1 and the first d-axis voltage Vd1 outputted from the V/F pattern when a current driving mode of the induction motor 40 is a V/F control mode.

Additionally, the selection unit 53 performs a switching operation in a PI current control mode (i.e., a driving mode) in order to select and output the output signals of the 1-axis PI current controller 60 and the d-axis PI current controller 61.

At this point, the V/F control mode and the PI current control mode may be distinguished by the operating frequency f generated from the frequency commanding unit 51.

That is, the operating frequency f includes a breakpoint for distinguishing a driving frequency for driving the induction motor normally from a stopping frequency for stopping the induction motor. That is, if the operating frequency f is higher than the breakpoint, it is a driving frequency for normally driving the induction motor. At this point, if the operating frequency f is reduced and reaches the breakpoint, the reduced operating frequency f is a stopping frequency for stopping the induction motor.

As a result, the operating frequency includes a breakpoint of the stopping frequency for stopping the induction motor. Accordingly, if the generated operating frequency f is higher than the stopping frequency, the selection unit 53 selects an output signal of the V/F pattern generating unit 52. Additionally, being different from that, if the operating frequency f reaches the stopping frequency, the selection unit 53 selects output signals of the q-axis PI current controller 60 and the d-axis PI current controller 61.

The two phase three phase voltage converting unit 54 converts the q-axis voltage Vq and the d-axis voltage Vd selected and outputted from the selection unit 53 into three phase voltages Va, Vb, and Vc.

The PWM generating unit 55 receives the three phase voltages Va, Vb, and Vc converted by the two phase three phase voltage converting unit 54, and then, converts a command value into a PWM signal according to the three phase voltages Va, Vb, and Vc.

Moreover, the PWM signal converted by the PWM generating unit is inputted into the PWM voltage generating unit 30.

The d-axis PI controller integral initial value setting unit 56 sets an initial value that is to be applied to an integrator of the d-axis PI current controller 61.

Moreover, the q-axis PI controller integral initial value setting unit 57 sets an initial value that is to be applied to an integrator of the q-axis PI current controller 60.

That is, if the operating frequency f reaches the stopping frequency, the selection unit 53 selects an output signal Vq2 of the q-axis PI current controller 60 and an output signal Vd2 of the d-axis PI current controller 61.

That is, if the operating frequency f corresponds to the driving frequency, the selection unit 53 selects the first q-axis voltage Vq1 and the first d-axis voltage Vd1 outputted from the V/F pattern generating unit 52. However, if the operating frequency f reaches the stopping frequency, the selection unit 53 selects the output signal Vq2 outputted from the q-axis PI current controller 60 and the second d-axis voltage Vd2 outputted from the d-axis PI current controller 61.

However, at this point, a level of the second q-axis voltage Vq2 and the second d-axis voltage Vd2 and a level of the first q-axis voltage Vq1 and the first d-axis voltage Vd1 have a predetermined difference. Accordingly, if the second q-axis voltage Vq2 and the second d-axis voltage Vd2 are selected after the mode changes (for example, the V/F control mode changes into the PI current control mode), drastic voltage change occurs.

Accordingly, the d-axis PI controller integral initial value setting unit 56 and the q-axis PI controller integral initial value setting unit 57 set an initial value that is to be applied to the q-axis PI current controller 60 and the d-axis PI current controller 61 in order to prevent the occurring voltage change.

More preferably, the d-axis PI controller integral initial value setting unit 56 detects the first d-axis voltage Vd1 occurring when the operating frequency f reaches the stopping frequency, and accordingly, sets the first d-axis voltage Vd1 with an integrator initial value of the d-axis PI current controller 61.

Moreover, the q-axis PI controller integral initial value setting unit 57 detects the first q-axis voltage Vq1 occurring when the operating frequency f reaches the stopping frequency, and accordingly, sets the first q-axis voltage Vq1 with an integrator initial value of the q-axis PI current controller 60.

The q-axis PI current controller 60 generates a second q-axis voltage Vq2 by using the initial value set by the q-axis PI controller integral initial value setting unit 57. The d-axis PI current controller 61 generates a second d-axis voltage Vd2 by using the initial value set by the d-axis PI controller integral initial value setting unit 56.

That is, when the V/F control mode changes into the PI current control mode, the first q-axis voltage Vq1 at the timing of when the mode changes is set as an initial value for outputting the second q-axis voltage Vq2.

Moreover, the first d-axis voltage Vd1 at the timing of when the mode changes is set as an initial value for outputting the second d-axis voltage Vd2.

Accordingly, this embodiment prevents a discontinuous voltage output that may occur at the timing of when the mode changes.

The DC stopping amount commanding unit 58 generates a final current target value IRef for entering into the PI current control mode when the operating frequency f reaches the stopping frequency.

The d-q axis current command generating unit 59 calculates a final q-axis current target value Iq_Ref and a final d-axis current target value Id_Ref by using the final current target value IRef generated by the DC stopping amount commanding unit 58.

In addition, the d-q axis current command generating unit 59 may sequentially generate a plurality of q-axis current command patterns in order to drive the q-axis PI current controller 60 by the calculated final q-axis current target value Iq_Ref.

In addition, the d-q axis current command generating unit 59 may sequentially generate a plurality of d-axis current command patterns in order to drive the d-axis PI current controller 61 by the calculated final d-axis current target value Id_Ref.

At this point, the final q-axis current target value Iq_Ref and the final d-axis current target value Id_Ref may be calculated by the following Equation 1 and Equation 2.

$$\text{Iq\_Ref} = IRef \times \frac{Iq1}{\sqrt{Iq1^2 + Id1^2}} \quad [\text{Equation 1}]$$

$$\text{Id\_Ref} = IRef \times \frac{Iq1}{\sqrt{Iq1^2 + Id1^2}} \quad [\text{Equation 2}]$$

The Iq1 is a q-axis current Iq outputted through the three phase two phase current converting unit 63 and the Id1 is a d-axis current Id outputted through the three phase two phase current converting unit 63.

Additionally, a combined current of the final q-axis current target value Iq_Ref and the final d-axis current target value Id_Ref becomes the final current target value IRef through the following Equation 3.

$$\sqrt{Iq_{Ref}^2 + Id\_Ref^2} = IRef \quad [\text{Equation 3}]$$

Firstly, the d-q axis current command generating unit 59 generates a plurality of q-axis current command patterns corresponding to the final q-axis current target value Iq_Ref as the mode changes.

According to a related art, the d-q axis current command generating unit 59 generates only one specific q-axis current command pattern corresponding to the final q-axis current target value Iq_Ref. However, when the q-axis current command pattern corresponding to the final q-axis current target value Iq_Ref is generated from the beginning, drastic change occurs in a q-axis current inputted to the q-axis PI current controller 60.

Accordingly, the d-q axis current command generating unit 59 generates a q-axis current command pattern corresponding to a plurality of q-axis current target values lower than the final q-axis current target value Iq_Ref before generating the final q-axis current target value Iq_Ref, and accordingly, generates a q-axis current command pattern corresponding to the final q-axis current target value Iq_Ref lastly.

Additionally, the d-q axis current command generating unit 59 generates a d-axis current command pattern corresponding to a plurality of d-axis current target values lower than the final d-axis current target value Id_Ref before generating the final d-axis current target value Id_Ref, and accordingly, generates a d-axis current command pattern corresponding to the final d-axis current target value Id_Ref lastly.

At this point, the d-q axis current command generating unit 59 determines each of the plurality of q-axis current target values and d-axis current target values, which are to occur according to a current that is currently supplied to the induction motor 40.

That is, the current detecting unit 62 detects three phase currents 1a, 1b, and Ic supplied to the induction motor 40, and the three phase two phase current converting unit 63 converts the detected three phase currents 1a, 1b, and Ic into two phase currents Iq and Id.

Then, the d-q axis current command generating unit 59 generates a q-axis current command pattern by using the q-axis current Iq of the converted two phase currents Iq and Id, and generates a d-axis current command pattern by using the d-axis current Id.

That is, the d-q axis current command generating unit 59 compares the q-axis current Iq with the final q-axis current target value Iq_Ref, and accordingly, if there is a great difference between two currents, generates a current command pattern corresponding to a specific q-axis current between the q-axis current Iq and the final q-axis current target value Iq_Ref.

In addition, the d-q axis current command generating unit 59 may continuously generate a q-axis current command pattern of a specific q-axis current between the q-axis current Iq and the final q-axis current target value Iq_Ref by performing the above same operation repeatedly. Moreover, the d-q axis current command generating unit 59 generates a q-axis current command pattern corresponding to the final q-axis current target value Iq_Ref lastly.

That is, the d-q axis current command generating unit 59 generates a q-axis current command pattern that has no big difference then the q-axis current Iq supplied to the induction motor 40 currently and is higher than the q-axis current Iq, and accordingly, as increasing the q-axis current according to the generated q-axis command pattern, lastly generates a q-axis current command pattern corresponding to the final q-axis current target value Iq_Ref.

As mentioned above, the d-q axis current command generating unit 59 firstly generates a specific d-axis current command pattern according to a current d-axis current Id before generating a d-axis current command pattern corresponding to the final d-axis current target value Id_Ref, and accordingly, generates a d-axis current command pattern corresponding to the final d-axis current target value Id_Ref lastly as increasing the generated specific d-axis current command pattern.

For example, if the current q-axis current Iq is 1 and the final q-axis current target value Iq_Ref is 5, the d-q axis current command generating unit 59 sequentially generates a q-axis current command pattern corresponding to 2 (a q-axis current), a q-axis current command pattern corresponding to 3, and a q-axis current command pattern corresponding to 4, and accordingly, generates a q-axis current command pattern corresponding to 5 lastly.

As mentioned above, if the current d-axis current Id is 1 and the final d-axis current target value Iq_Ref is 5, the d-q axis current command generating unit 59 sequentially generates a d-axis current command pattern corresponding to 2 (a d-axis current), a d-axis current command pattern corresponding to 3, and a d-axis current command pattern corresponding to 4, and accordingly, generates a d-axis current command pattern corresponding to 5 lastly.

The q-axis PI current controller 60 controls a q-axis current value to follow a q-axis current value according to the generated q-axis current command pattern.

Additionally, the d-axis PI current controller 61 controls a d-axis current value to follow a d-axis current value according to the generated d-axis current command pattern.

That is, according to an embodiment, once a DC stopping operation starts while the inductor motor 40 operates in the V/F control mode, the d-q axis current command generating unit 59 sequentially generates a plurality of q-axis current command patterns and a plurality of d-axis current command patterns to gradually follow the final q-axis current target value Iq_Ref and the final d-axis current target value Id_Ref (that is, in order to prevent a drastic change of q-axis and d-axis currents).

Moreover, in order to initially prevent a drastic change of the second q-axis voltage Vq2 and the second d-axis voltage Vd2 outputted from the q-axis PI current controller 60 and the d-axis PI current controller 61, an integrator initial value of the q-axis PI current controller 60 and the d-axis PI current controller 61 is set by using the first q-axis voltage Vq1 and the first d-axis voltage Vd1.

Figure 3:
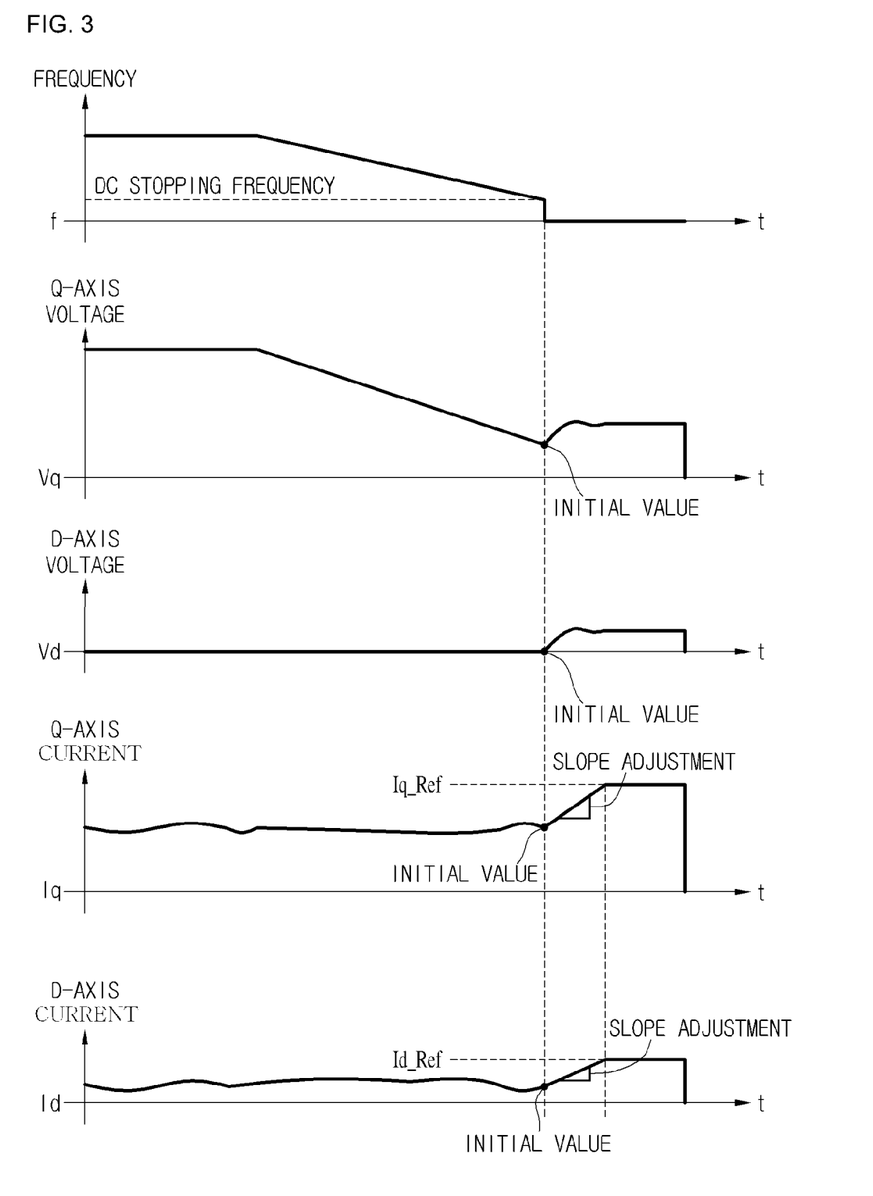
FIG. 3 is a view illustrating a current and voltage change in a stopping mode according to an embodiment.

FIG. 3 is a view illustrating a current and voltage change in a stopping mode according to an embodiment.

Referring to FIG. 3, it is confirmed that a q-axis voltage and a d-axis voltage, which are generated at the timing of when the induction motor 40 begins to stop through the stopping device of the induction motor, are changed less than a related art q-axis voltage and d-axis voltage.

Additionally, this embodiment lowers a slope according to a change of q-axis current and a d-axis current so that drastic current change may be prevented.

Figure 4:
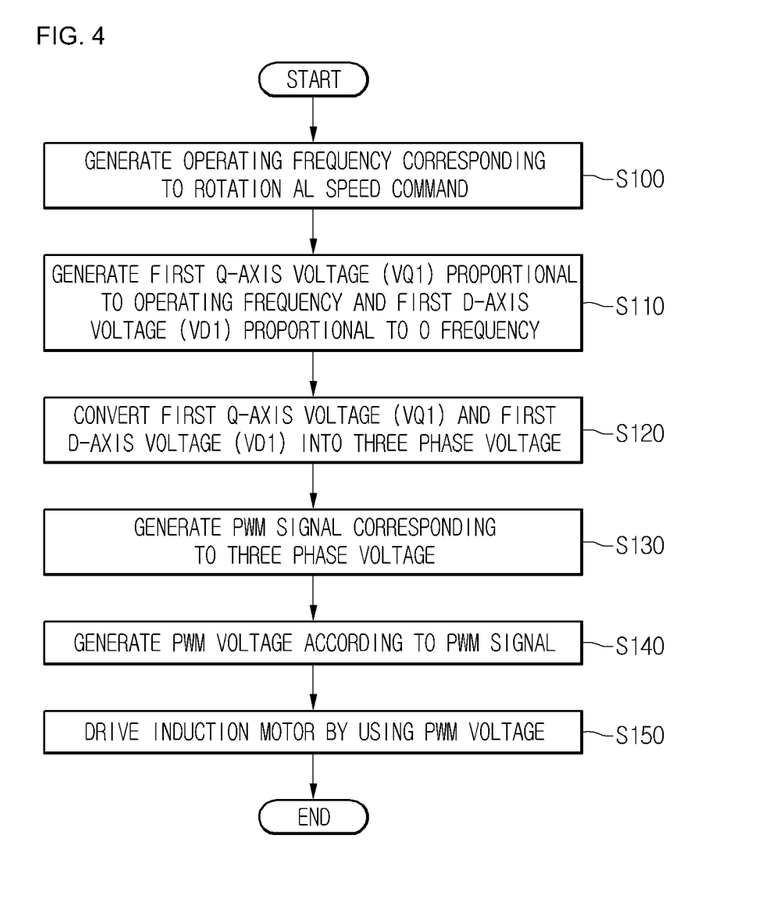
FIG. 4 is a flowchart illustrating an operation method of an induction motor according to an embodiment.
Figure 5:
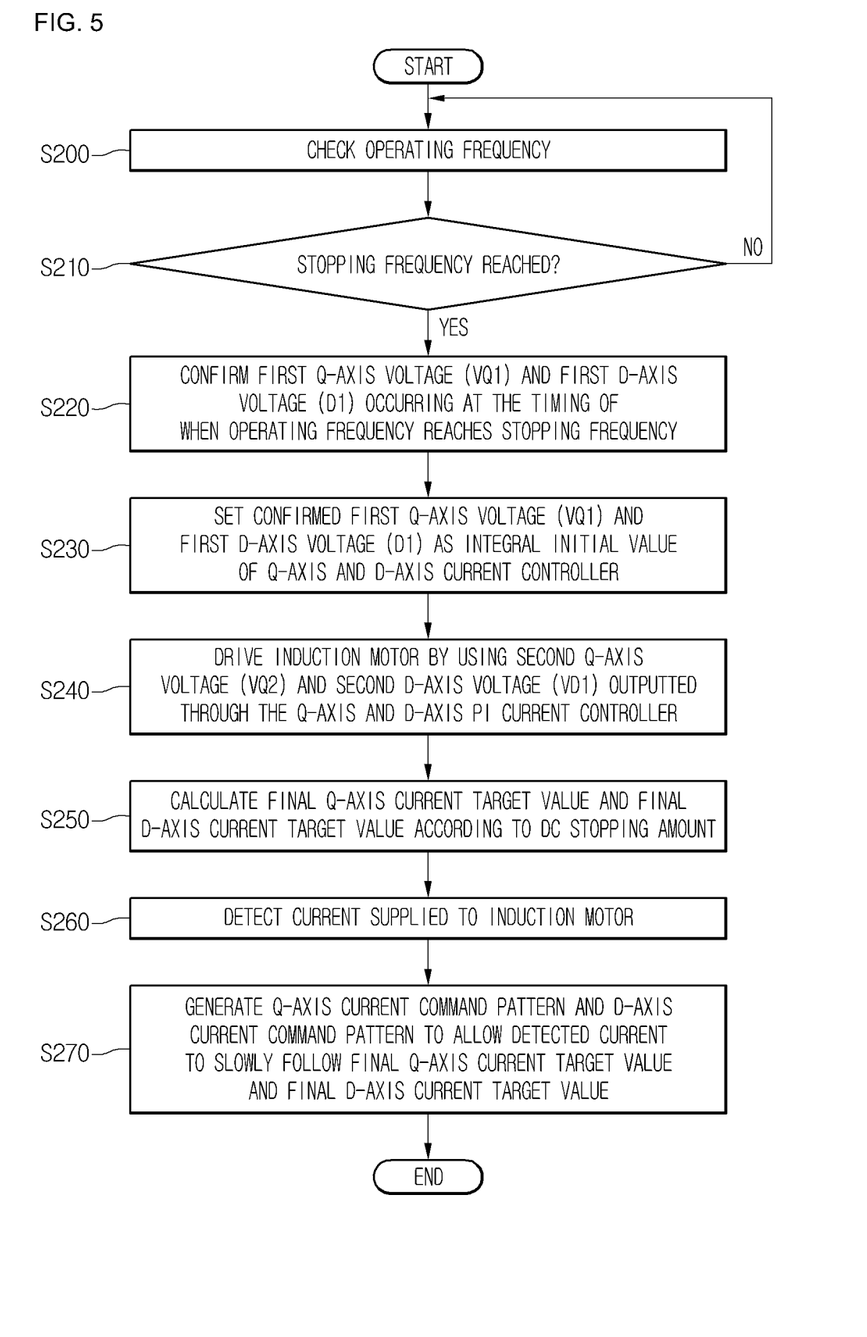
FIG. 5 is a flowchart illustrating a method of stopping an induction motor according to an embodiment.

FIG. 4 is a flowchart illustrating a method of driving an induction motor according to an embodiment. FIG. 5 is a flowchart illustrating a method of stopping an induction motor according to an embodiment.

Hereinafter, FIGS. 4 and 5 are combined with FIG. 2 for description.

Referring to FIG. 4, the frequency commanding unit 51 firstly generates an operating frequency f corresponding to a rotational speed command in operation S100. At this point, the operating frequency f means a frequency for driving the induction motor 40.

Once the operating frequency f is generated, the V/F pattern generating unit 52 generates a first q-axis voltage Vq1 proportional to the generated operating frequency f in operation S110. Additionally, the V/F pattern generating unit 52 generates a first d-axis voltage Vd1 proportional to a 0 frequency.

Then, the two phase three phase voltage converting unit 54 converts the generated first q-axis voltage Vq1 and first d-axis voltage Vd1 into three phase voltages in operation S120. That is, the two phase three phase voltage converting unit 54 converts the two phase currents Vq1 and Vd1 into the three phase currents Va, Vb, and Vc.

The PWM generating unit 55 outputs a PWM signal corresponding to the three phase currents Va, Vb, and Vc in operation S130. That is, the PWM generating unit 55 generates and outputs a PWM signal corresponding to each of the three phase currents Va, Vb, and Vc.

The PWM voltage generating unit 55 generates a PWM voltage signal for driving the induction motor 40 in operation S140 by using the power rectified by the rectifying unit 20 and the generated PWM signal, and thus the induction motor 40 generates rotational power through the generated PWM voltage signal in operation S150.

FIG. 4 is a flowchart of a general V/F control mode according to an embodiment.

Hereinafter, the case that a V/F control mode changes into a PI current control mode will be described.

Referring to FIG. 5, the selection unit 53 checks the generated operating frequency f periodically in operation S200.

Also, the selection unit 53 determines whether the operating frequency f reaches a stopping frequency or not in operation S210. That is, it is determined whether the reduced operating frequency f is identical to or lower than the stopping frequency as the operating frequency f is continuously reduced.

Based on the determination result in operation S210, if the operating frequency f reaches the stopping frequency, the selection unit 53 stops selecting of the first q-axis voltage Vq1 and the first d-axis voltage Vd1. Then, the selection unit 53 selects the second q-axis voltage Vq2 and the second d-axis voltage Vd2 outputted from the q-axis PI current controller 60 and the d-axis PI current controller 61.

At this point, prior to the operation of the selection unit 53, the d-axis PI control integral initial value setting unit 56 confirms the first d-axis voltage Vd1 outputted at the timing of when the operating frequency f reaches the stopping frequency, and the q-axis PI integrator integral initial setting unit 57 confirms the first q-axis voltage Vq1 in operation S220.

Moreover, the d-axis PI controller integral initial value setting unit 56 sets the confirmed first d-axis voltage Vd1 as an integral initial value of the d-axis PI current controller 61.

Moreover, the q-axis PI controller integral initial value setting unit 57 sets the confirmed first q-axis voltage Vq1 as an integral initial value of the q-axis PI current controller 61 in operation S230.

That is, the d-axis PI controller integral initial value setting unit 56 and the q-axis PI controller integral initial value setting unit 57 set the first q-axis voltage Vq1 and the first d-axis voltage Vd1 outputted at the timing of when the mode changes as the second q-axis voltage Vq2 and the second d-axis voltage Vd2.

Accordingly, the induction motor 40 is driven using a PWM voltage according to the outputted second q-axis voltage Vq2 and second d-axis voltage Vd2 in operation S240.

Then, the DC stopping amount commanding unit 58 generates the final current target value IRef for entering into a PI current control mode, and accordingly, the d-q axis current command generating unit 59 calculates the final q-axis current target value Iq_Ref and the final d-axis current target value Id_Ref by using the final current target value IRef in operation S250.

The current detecting unit 62 detects and outputs three phase currents Ia, Ib, and Ic supplied to the induction motor 40, and the three phase two phase current converting unit 63 converts the detected three phase currents Ia, Ib, and Ic into two phase currents Iq and Id and then outputs the two phase currents Iq and Id into the d-q axis current command generating unit 59 in operation S260.

Also, the d-q axis current command generating unit 59 generates a plurality of q-axis current command patterns and a plurality of d-axis current command patterns in order to allow the detected two phase current to gradually follow the final q-axis current target value and the final d-axis current target value in operation S270.

That is, the d-q axis current command generating unit 59 generates a q-axis current command pattern according to a current value higher than the q-axis current Iq detected at the first timing. Additionally, the d-q axis current command generating unit 59 generates a q-axis current command pattern according to a current value higher than the q-axis current detected at the second timing after the first timing. Additionally, the d-q axis current command generating unit 59 generates a q-axis current command pattern according to a current value higher than the q-axis current detected at the Nth timing.

At this point, a current value generated at the Nth timing may correspond to the final q-axis current target value Iq_Ref.

That is, the d-q axis current command generating unit 59 includes a plurality of operations between a current q-axis current and the final q-axis current target value Iq_Ref, and accordingly, generates a q-axis current command pattern corresponding to a q-axis current of each operation.

Moreover, the d-q axis current command generating unit 59 sequentially generates a plurality of d-axis current command patterns corresponding to the d-axis current through the above method.

According to the embodiments of the present invention, on stopping an induction motor, a final voltage outputted before stopping the induction motor is set as an initial value for stopping the induction motor, and accordingly, a plurality of current command patterns are sequentially generated in order to gradually increase a final current command value for stopping the induction motor. Therefore, according to the embodiments of the present invention, a drastic current and voltage change occurring during induction motor stopping is prevented, so that the induction motor stops smoothly without a phenomenon that pulsation occurs or the induction motor rotates in a reverse direction and then stops.

Moreover, although the preferred embodiments of the present invention are described above, the present invention is not limited the above-mentioned specific embodiments. It will be understood by those skilled in the art that various changes in forms and details may be made therein without departing from the spirit and scope of the invention. Also, these modified embodiments should be understood without departing from the technical scope or prospect of the present invention.

What is claimed is:

1. A device for stopping an induction motor, the device comprising:
a frequency commanding unit for generating an operating frequency corresponding to a rotational speed command of the induction motor;
a q-axis and d-axis Voltage/Frequency (V/F) converter for outputting a first q-axis voltage (Vq1) proportional to the generated operating frequency and a first d-axis voltage (Vd1) proportional to a 0 frequency;
a q-axis Proportional-Integral (PI) current controller for outputting a second q-axis voltage (Vq2) for stopping the induction motor when the operating frequency reaches a stopping frequency;
a d-axis PI current controller for outputting a second d-axis voltage (Vd2) for stopping the induction motor when the operating frequency reaches the stopping frequency;
a selection unit for selecting and outputting the first q-axis and d-axis voltages (Vq1 and Vd1) or the second q-axis and d-axis voltages (Vq2 and Vd2) according to the operating frequency generated by the frequency commanding unit;
a q-axis integral initial value setting unit for setting an integral initial value of the q-axis PI current controller by using the first q-axis voltage (Vq1) occurring at the timing when the operating frequency reaches the stopping frequency;
a d-axis integral initial value setting unit for setting an integral initial value of the d-axis PI current controller by using the first d-axis voltage (Vd1) occurring at the timing when the operating frequency reaches the stopping frequency; and a stopping amount commanding unit for generating a final current target value (IRef) according to a DC stopping amount when the operating frequency reaches the stopping frequency, wherein the selection unit selects the first q-axis and d-axis voltages (Vq1 and Vd1) if the operating frequency corresponds to the driving frequency, and selects the second q-axis and d-axis voltages (Vq2 and Vd2) when the operating frequency reaches the stopping frequency.

2. The device according to claim 1, further comprising:

a q-axis current command generating unit for generating a q-axis current command pattern that is to be applied to the q-axis PI current controller by using the final current target value (IRef); and a d-axis current command generating unit for generating a d-axis current command pattern that is to be applied to the d-axis PI current controller by using the final current target value (IRef).

3. The device according to claim 2, wherein the q-axis current command generating unit calculates a final q-axis current target value (Iq_Ref) that is to be applied to the q-axis PI current controller by using the final current target value (IRef); and the d-axis current command generating unit calculates a final d-axis current target value (Id_Ref) that is to be applied to the d-axis PI current controller by using the final current target value (IRef).

4. The device according to claim 3, wherein the q-axis current command generating unit sequentially generates a plurality of q-axis current command patterns corresponding to the final q-axis current target value (Iq_Ref); and the d-axis current command generating unit sequentially generates a plurality of d-axis current command patterns corresponding to the final d-axis current target value (Id_Ref).

5. The device according to claim 4, wherein a q-axis current command pattern, which is outputted lastly among the plurality of q-axis current command patterns generated sequentially by the q-axis current command generating unit, corresponds to the final q-axis current target value (Iq_Ref); and a d-axis current command pattern, which is outputted lastly among the plurality of d-axis current command patterns generated sequentially by the d-axis current command generating unit, corresponds to the final d-axis current target value (Id_Ref).

6. The device according to claim 4, further comprising:

a three phase current detector for detecting three phase currents (Ia, Ib, and Ic) supplied to the induction motor; and a three phase two phase current converting unit for converting the three phase currents (Ia, Ib, and Ic) detected by the three phase current detector into two phase q-axis current (Iq) and d-axis current (Id).

7. The device according to claim 6, wherein the q-axis current command generating unit sequentially generates a q-axis current command pattern corresponding to a plurality of q-axis currents between the q-axis current (Iq) and the final q-axis current target value (Iq_Ref); and the d-axis current command generating unit sequentially generates a d-axis current command pattern corresponding to a plurality of d-axis currents between the d-axis current (Id) and the final d-axis current target value (Id_Ref).

8. The device according to claim 7, wherein the q-axis current used for generating the plurality of q-axis current command patterns is gradually increased to be identical to the final q-axis current target value (Iq_Ref) lastly; and the d-axis current used for generating the plurality of d-axis current command patterns is gradually increased to be identical to the final d-axis current target value (Id_Ref) lastly.

9. A method of stopping an induction motor, the method comprising:

driving the induction motor on the basis of a first q-axis voltage (Vq1) proportional to an operating frequency and a first d-axis voltage (Vd1) proportional to a 0 frequency;

determining whether the operating frequency reaches a stopping frequency;

sequentially outputting a plurality of q-axis current command patterns and d-axis current command patterns when the operating frequency reaches the stopping frequency;

stopping the induction motor by using a second q-axis voltage (Vq2) and a second d-axis voltage (Vd2) corresponding to the plurality of sequentially outputted q-axis and d-axis current command patterns;

setting the second q-axis voltage (Vq2) and the second d-axis voltage (Vd2) that are to be outputted initially when the operating frequency reaches the stopping frequency;

calculating a final q-axis current target value (Iq_Ref) and a final d-axis current target value (Id_Ref) by using a final current target value (IRef) according to a DC stopping amount when the operating frequency reaches the stopping frequency, wherein the sequentially outputting the plurality of q-axis current commands patterns and d-axis current command patterns comprises:

sequentially generating a q-axis current command pattern corresponding to a plurality of q-axis currents between a first q-axis current according to the initially-outputted second q-axis voltage (Vq2) and the final q-axis current target value (Iq_Ref); and sequentially generating a d-axis current command pattern corresponding to a plurality of d-axis currents between a first d-axis current according to the initially-outputted second d-axis voltage (Vq2) and the final d-axis current target value (Id_Ref), wherein the sequentially generating the q-axis current command pattern comprises:

generating a first q-axis current command pattern according to a second q-axis current between the first q-axis current and the final q-axis current target value (Iq_Ref);

generating a second q-axis current command pattern according to a third q-axis current between the second q-axis current and the final q-axis current target value (Iq_Ref);

generating an Nth q-axis current command pattern according to an Nth q-axis current between the third q-axis current and the final q-axis current target value (Iq_Ref); and generating a final q-axis current command pattern according to the final q-axis current target value (Iq_Ref), wherein the relational equation of the first q-axis current>the second q-axis current>the third q-axis current>the Nth q-axis current>the final q-axis current target value (Iq_Ref) is satisfied.

10. The method according to claim 9, wherein the initially-outputted second q-axis voltage (Vq2) and second d-axis voltage (Vd2) are a first q-axis voltage (Vq1) and a first d-axis voltage (Vd1) outputted at the timing of when the operating frequency reaches the stopping frequency.

11. The method according to claim 9, wherein a lastly outputted q-axis current command pattern among the sequentially generated q-axis current command patterns corresponds to the final q-axis current target value (Iq_Ref); and a lastly outputted d-axis current command pattern among the sequentially generated d-axis current command patterns corresponds to the final d-axis current target value (Id_Ref).

12. The method according to claim 9, wherein the sequentially generating the d-axis current command pattern comprises:

generating a first d-axis current command pattern according to a second d-axis current between the first d-axis current and the final d-axis current target value (Id_Ref);

generating a second d-axis current command pattern according to a third d-axis current between the second d-axis current and the final d-axis current target value (Id_Ref);

generating an Nth d-axis current command pattern according to an Nth d-axis current between the third d-axis current and the final d-axis current target value (Id_Ref); and generating a final d-axis current command pattern according to the final d-axis current target value (Id_Ref), wherein the relational equation of the first d-axis current>the second d-axis current>the third d-axis current>the Nth d-axis current>the final d-axis current target value (Id_Ref) is satisfied.

* * * * *